UNITED STATES PATENT OFFICE.

AUGUST JONAS AND EDUARD TSCHUNKUR, OF LEVERKUSEN, GERMANY, ASSIGNORS TO FARBENFABRIKEN VORM. FRIEDR. BAYER. & CO., OF ELBERFELD, GERMANY, A CORPORATION OF GERMANY.

PROCESS OF PRODUCING PINACONES.

1,079,916.     Specification of Letters Patent.     Patented Nov. 25, 1913.

No Drawing.     Application filed December 16, 1911. Serial No. 666,259.

*To all whom it may concern:*

Be it known that we, AUGUST JONAS and EDUARD TSCHUNKUR, doctors of philosophy, chemists, citizens of the German Empire, residing at Leverkusen, near Cologne, Germany, have invented new and useful Improvements in Processes of Producing Pinacones, of which the following is a specification.

The present invention relates to a new and valuable process for producing homologues of pinacone from ketones, such as diethylketone, methylethylketone, methylpropylketone, which process consists in treating ketones of the formula R—CO—R' (R meaning a substituent with more than one carbon e. g. —$C_2H_5$, —$C_3H_7$, etc., R' meaning a substituent e. g. —$CH_3$, —$C_2H_5$, —$C_3H_7$, etc.) with aluminum amalgam with or without the addition of agents promoting the reaction, such as iodin, chlorin, or its compounds such as choloroform, bromoform, $CCl_4$, $Cl_3$—C—C—$Cl_3$, chloral, chloralhydrate, $SbCl_3$, etc.

In order to illustrate the new process more fully the following example is given, the parts being by weight:—To 360 parts of aluminum powder or shavings, 840 parts of diethylketone and 250 parts of mercuric chlorid and then 1600 parts of benzene are added. The mixture is stirred for 4–5 hours on gently heating. When the reaction is complete the organo-aluminum compound is decomposed by the addition of 2000 parts of ice water. Hydrochloric acid is added to disssolve the precipitated aluminum hydroxid. The oil separated is removed, washed and distilled *in vacuo*. The tetraethylglycol thus obtained of the formula

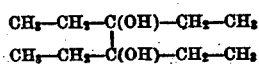

boils at 116–119° C. under a pressure of 17 mm. It crystallizes from ether. Melting point 27–28° C. From methylethylketone the dimethyldiethylglycol (boiling point 78–79° C.; 3 mm.) and from methylpropylketone the dimethyldipropylglycol (melting point 95° C.) is obtained.

We claim:—

1. The process of producing a pinacone from a ketonic homologue of acetone which comprises treating such ketonic homologue with aluminum amalgam to form an organo-aluminum compound and decomposing the organo-aluminum compound, substantially as described.

2. The process of producing a pinacone from a ketonic homologue of acetone which comprises treating such ketonic homologue with aluminum amalgam in the presence of an agent promoting the reaction to form an organo-aluminum compound and decomposing the organo-aluminum compound, substantially as described.

3. Process of producing tetraethylglycol from diethylketone which comprises treating diethylketone with aluminum amalgam to form an organo-aluminum compound and decomposing the organo-aluminum compound, substantially as described.

4. Process of producing tetraethylglycol from diethylketone which comprises treating diethylketone with aluminum amalgam in the presence of an agent promoting the reaction to form an organo-aluminum compound and decomposing the organo-aluminum compound, substantially as described.

5. Process for producing a pinacone from a ketonic homologue of acetone which comprises treating such ketonic homologue with mercuric chlorid and metallic aluminum to form an organo-aluminum compound and decomposing the organo-aluminum compound, substantially as described.

6. Process for producing a pinacone from a ketonic homologue of acetone which comprises treating such ketonic homologue with mercuric chlorid and metallic aluminum, in the presence of an agent promoting the reaction to form an organo-aluminum compound and decomposing the organo-aluminum compound, substantially as described.

7. Process of producing tetraethylglycol from diethylketone which comprises treating diethylketone with mercuric chlorid and metallic aluminum to form an organo-aluminum compound and decomposing the organo-aluminum compound, substantially as described.

8. Process for producing tetraethylglycol from diethylketone which comprises treating diethylketone with mercuric chlorid and metallic magnesium in the presence of an agent promoting the reaction to form an organo-aluminum compound and decomposing the organo-aluminum compound, substantially as described.

In testimony whereof we have hereunto set our hands in the presence of two subscribing witnesses.

AUGUST DR. JONAS. [L. S.]
EDUARD TSCHUNKUR. [L. S.]

Witnesses:
HELEN NUFER,
A. NUFER.